(12) United States Patent
Mohr et al.

(10) Patent No.: US 12,449,064 B2
(45) Date of Patent: Oct. 21, 2025

(54) CAGE VALVE

(71) Applicant: SAMSON Aktiengesellschaft, Frankfurt am Main (DE)

(72) Inventors: Stefan Mohr, Frankfurt am Main (DE); Jonas Waid, Darmstadt (DE)

(73) Assignee: SAMSON Aktiengesellschaft (DE)

( * ) Notice: Subject to any disclaimer, the term of this patent is extended or adjusted under 35 U.S.C. 154(b) by 0 days.

(21) Appl. No.: 18/564,726

(22) PCT Filed: May 19, 2022

(86) PCT No.: PCT/EP2022/063649
§ 371 (c)(1),
(2) Date: Nov. 28, 2023

(87) PCT Pub. No.: WO2022/248339
PCT Pub. Date: Dec. 1, 2022

(65) Prior Publication Data
US 2024/0255072 A1    Aug. 1, 2024

(30) Foreign Application Priority Data
May 28, 2021 (DE) ...................... 20 2021 102 938.2

(51) Int. Cl.
*F16K 3/24* (2006.01)
*F16K 47/08* (2006.01)

(52) U.S. Cl.
CPC .............. *F16K 47/08* (2013.01); *F16K 3/246* (2013.01)

(58) Field of Classification Search
CPC . F16K 47/04; F16K 47/14; F16K 3/24; F16K 3/246
See application file for complete search history.

(56) References Cited

U.S. PATENT DOCUMENTS

| | | |
|---|---|---|
| 3,602,261 A | 8/1971 | Brown |
| 5,730,416 A * | 3/1998 | Welker .................... F16K 47/08 251/118 |
| 6,935,371 B2 | 8/2005 | Stares |
| 9,732,859 B2 | 8/2017 | Eilers et al. |
| 9,759,348 B2 | 9/2017 | Adams et al. |

(Continued)

FOREIGN PATENT DOCUMENTS

| | | |
|---|---|---|
| DE | 102015005611 A1 | 11/2016 |
| DE | 102016102756 A1 | 8/2017 |

(Continued)

*Primary Examiner* — Hailey K. Do
(74) *Attorney, Agent, or Firm* — Frijouf, Rust & Pyle, P.A.

(57) ABSTRACT

The invention relates to a cage valve (10) comprising a valve housing (12) with a valve inlet (14) and a valve outlet (16), a valve cage (20) which is arranged between the valve inlet and valve outlet (14, 16) in the flow channel, and a valve element (18) which is movably supported in the valve housing (12) in the axial direction (a) with respect to the valve cage (20), wherein the valve cage (20) has a guide region, which guides the valve element (18) in the axial direction (a), and a throttle region, which has multiple throttle channels (22) that are mutually spaced in the axial direction and are arranged in a distributed manner when viewed in the circumferential direction (u), so that different throttle rates can be set on the basis of the axial position of the valve element (18) relative to the valve cage (20).

12 Claims, 4 Drawing Sheets

(56) References Cited

U.S. PATENT DOCUMENTS

| | | |
|---|---|---|
| 10,539,252 B2 | 1/2020 | Adams et al. |
| 10,871,243 B2 | 12/2020 | Sander et al. |
| 2003/0159737 A1 | 8/2003 | Stares |
| 2005/0166976 A1 | 8/2005 | Folk et al. |
| 2009/0026395 A1 | 1/2009 | Perrault et al. |
| 2010/0288389 A1 | 11/2010 | Hopper et al. |
| 2016/0341335 A1 | 11/2016 | Adams et al. |
| 2017/0123477 A1 | 5/2017 | Chakra et al. |
| 2017/0234440 A1 | 8/2017 | Detmers et al. |

FOREIGN PATENT DOCUMENTS

| | | |
|---|---|---|
| EP | 2489910 A1 | 8/2012 |
| JP | S5450710 A | 4/1979 |
| JP | S58137670 A | 8/1983 |
| JP | S59140970 A | 8/1984 |
| WO | WO2003081097 | 10/2003 |
| WO | WO2009015094 A1 | 1/2009 |
| WO | WO2016069965 | 5/2016 |
| WO | WO2016187246 A1 | 11/2016 |

* cited by examiner

CAGE VALVE

This patent application is the national phase entry of PCT/EP2022/063649, international application filing date May 19, 2022, which claims the benefit and priority of and to German patent application no. 20 2021 102 938.2, filed May 28, 2021.

PCT/EP2022/063649, international application filing date May 19, 2022 and German patent application no. 20 2021 102 938.2, filed May 28, 2021 are incorporated herein by reference hereto in their entire-ties.

BACKGROUND OF THE INVENTION

The invention relates to a cage valve.

Cage valves are well known in the art and generally comprise a valve element which is movably supported in the cage valve housing in the axial direction a, and a valve cage that interacts with the valve element. In addition to a guide region guiding the valve element, the valve cage has, in particular, a throttle region with multiple throttle channels arranged in such a way that the opening width of the valve cage, i.e. the number of closed or opened throttle channels and thus the throttle rate, can be set on the basis of the stroke position of the valve element. In addition to the valve cage, cage valves also have a valve seat that interacts with the valve element in a known manner and is designed to be complementary to the valve element, so that in the closed position, i.e. when the valve element is in contact with the valve seat, the valve is closed. By way of example only, reference is made to DE 10 2015 005611 A1.

It is further known in the art that flow, pressure reduction and cavitation can be deliberately influenced by designing the throttle channels appropriately. In addition to designing the associated throttle openings of the throttle channels as round, square or elongated holes, with the throttle channels extending in a straight or helical form over their entire length, see DE 10 2015 005 611 A1, throttle channels which extend in a curved, inclined, conical [manner] and/or which have inner walls with edges and/or undercuts are also known, see DE 10 2016 102 756 A1.

JP 59140970A and JP 58137670A disclose cage valves whose valve cages have throttle channels that are aligned or arranged in such a way that process medium flows, which enter the throttle channels via throttle inlet openings on the radially outer side and [exit] the throttle channels via throttle inlet openings on the radially inner side, are deflected or bundled downwards inside the valve cage.

SUMMARY OF THE INVENTION

It is the object of the invention to further develop a cage valve of the type specified in the preamble of claim 1 in such a way that a reduction of high differential pressures within the valve can be achieved and the valve also has a low degree of cavitation and wear, as well as reduced noise emissions.

This object is accomplished by the characterizing features of claim 1 in conjunction with the features of its preamble.

Dependent claims 2-12 relate to advantageous further embodiments of the cage valve according to the invention.

The invention is based on the realization that the impact energy of the process medium flows, i.e. the energy with which the process medium flows exiting the throttle channels of the valve cage collide with the surrounding walls of the valve housing, has a decisive effect on the cavitation, wear and noise emissions of the cage valve.

In a known manner, the cage valve comprises a valve housing with a valve inlet and a valve outlet, and an essentially sleeve-shaped valve cage which is arranged between the valve inlet and the valve outlet in the flow channel. The cage valve further comprises, in a known manner, a valve element, which is movably supported in the axial direction a with respect to the valve cage, and a valve seat, which interacts with the valve element and is designed in a complementary manner to the valve element. In a known manner, the valve cage permanently arranged in the valve housing of the cage valve has a guide region, which guides the valve element in the axial direction a, and a throttle region, which has multiple throttle channels that are mutually spaced in the axial direction and are arranged in a distributed manner when viewed in the circumferential direction u.

For the sake of completeness only, it should be noted that the term 'throttle channel' is generally understood to refer to a channel that penetrates the lateral surface of the valve cage and accordingly has a throttle inlet opening on the inside of the valve cage—when viewed in radial direction r—and a throttle outlet opening on the outside of the valve cage. In particular, it should be noted that the term 'throttle channel' is not to be understood restrictively as a channel designed in the form of a straight bore, but is rather intended to mean different shapes and cross-sectional extents, such as a helically coiled channel course, a curved channel course, with circular, elliptical or polygonal channel cross-sections, and with a channel cross-section that is constant, or continuously increases, or continuously decreases, etc., in the direction of flow.

The valve cage is arranged in the valve housing in such a way that, during operation, a process medium enters the valve housing via the valve inlet and then enters the sleeve-shaped valve cage via the front inlet surface, flows through the inside of the valve cage and exits the valve cage again from the throttle channels, or the throttle outlet openings of the throttle channels, and then exits the cage valve again from the valve outlet. In other words, different throttle rates can be set in a known manner by appropriately positioning the valve element axially in relation to the valve cage.

According to the invention, the throttle channels are now arranged in such a way that the process medium flows emerging from the throttle channels, in addition to being deflected in the circumferential direction u towards the valve outlet, also flow out bundled and aligned in the axial direction a.

The arrangement of the throttle channels according to the invention has the effect that, due to the deflection and alignment of the process medium flows flowing out of the throttle channels in the circumferential direction u and in the axial direction a, the exiting process medium flows will no longer impact in a normal or perpendicular direction on the surrounding walls of the valve housing. This in turn means that the impact energy of the process medium flows is significantly reduced as they impact on the housing walls. In an advantageous manner, this makes it possible to achieve reduced high differential pressures with less cavitation and wear, as well as reduced noise emissions.

In a particularly preferred embodiment of the invention—in relation to a Cartesian coordinate system in which the x axis is aligned in the direction of the valve outlet, the z axis is aligned upwards in the axial direction a, and the y axis is perpendicular to the x, z axes—the throttle outlet openings of the throttle channels on the outside of the valve cage are each arranged in xy planes that are parallel to the xy coordinate plane. In other words, when viewed in the axial direction a, multiple rows with throttle outlet openings distributed in the circumferential direction are provided, with the throttle outlet openings of one row, i.e. the centers of the throttle outlet openings, each having the same z coordinate values. The throttle channels of the throttle outlet openings located in an xy plane are each aligned in such a way that, on the one hand, when projected into the associated xy plane—the channel axes of the throttle channels are each set at an angle α to the x axis of this plane in such a way that the process medium flows emerging from the throttle outlet openings of an xy plane are each deflected in the direction of the valve outlet, and on the other hand—when projected into the xz coordinate plane—the channel axes are each set at an angle ß in relation to the x axis in such a way that the process medium flows emerging from the throttle outlet openings are bundled and aligned in the z direction.

The wording, namely that the process medium flows exiting through the throttle outlets are each being deflected in the direction of the valve outlet, is to be understood in particular to mean that the process medium flows exiting from the valve outlet openings each have a velocity vector $$\vec{v} = \begin{pmatrix} v_x \\ v_y \\ v_z \end{pmatrix}$$

where vx>0, i.e. the velocity component of the process medium flows that acts in the x direction, i.e. in the direction of the valve outlet, will always be greater than zero.

The further wording, namely that—when projected into the xz coordinate plane—the channel axes of the throttle channels are each set at an angle ß in relation to the x axis in such a way that the process medium flows emerging from the throttle outlet openings are bundled and aligned in the z direction, is to be understood in particular as meaning that each individual row of the multiple rows of throttle outlet openings arranged in a distributed manner in the circumferential direction, when viewed in the axial direction a, now has an individual outflow direction in relation to the z axis. It is also conceivable for the throttle outlets of one row to have individual, i.e. different, flow directions.

This means that the process medium flows exiting from the throttle outlet openings are bundled tangentially in the direction of the valve cage surface and are bundled in the z or axial direction, i.e. vertically. This advantageously ensures a particularly effective inflow of the process medium flows emerging from the throttle outlet openings into the valve outlet of the cage valve.

Preferably, the channel axes of the throttle channels are positioned in relation to the x axis at an angle ß of 0°≤angle ß≤60° to the horizontal, i.e. upwards or downwards.

Preferably, the throttle channels of the throttle outlet openings located in an xy plane are aligned in such a way that—when projected into the associated xy plane—and in relation to the xy coordinate system spanning this plane, in quadrants I and IV, the channel axes of the throttle channels form an angle α of 0°≤angle α≤45°, and in quadrants II and III, the channel axes of the throttle channels form an angle α of 80°≤angle α≤150°, with the x axis.

For the sake of completeness only, it should be noted that the angle α between the x axis and the channel axis in quadrants I and II refers to the counterclockwise angle between the x axis and the channel axis, and in quadrants III and IV, this angle refers to the clockwise angle between the x axis and the channel axis.

Aligning the channel axes in accordance with the aforementioned angular values a advantageously ensures that the process medium flows are deflected 'close to' the outer valve cage surface in the direction of the valve outlet or, in other words, that the flow lines are away as far as possible from the surrounding valve housing walls.

Moreover, since alignments of the channel axes at an angle of 90° and 180°, or close to 90° and 180°, are in particular excluded, this advantageously ensures that critical points are not directly exposed to the flow. As already mentioned, this protects the valve body from possible erosion due to cavitation and particle impact, thus extending its service life and enabling use in critical applications such as flashing.

Preferably, it is provided for the throttle outlet openings located in an xy plane or—if projected into the associated xy plane, the channel axes of the throttle channels associated with the throttle outlet openings—to be arranged axially symmetrically to the x axis of the xy coordinate system spanning this plane. The axially symmetrical arrangement of the throttle outlet openings, or of the associated channel axes of the throttle channels, advantageously prevents rotation of the flow in the area of the valve outlet.

In another embodiment of the invention, the throttle outlet openings located in an xy plane are arranged in an evenly distributed manner when viewed in the circumferential direction u.

An alternative and particularly preferred embodiment of the invention is characterized in that the throttle outlet openings lying in an xy plane are arranged in an unevenly distributed manner in the circumferential direction u in such a way that—in relation to the xy coordinate system spanning this plane—there are more throttle outlet openings arranged in quadrants I and IV than in quadrants II and III. In other words, when viewed in the circumferential direction u, the distance between the throttle outlet openings is smaller in the area of the valve cage facing the valve outlet, i.e. in quadrants I and IV in the top view, than in the rear area of the valve cage, i.e. the area surrounding quadrants II and III in the top view. This advantageously ensures that a major part of the exiting process medium flows will enter the valve outlet with virtually no deflection.

Preferably, the throttle channels of the throttle outlet openings located in an xy plane are aligned in such a way that—when projected into the associated xy plane and in relation to the xy coordinate system spanning this plane—the channel axes of the throttle channels meet at a common intersection point located on the x axis and having a negative x value. This means that the channel axes have a common center, which lies on the x axis and is shifted 'backwards' from the center of the valve cage, i.e. in the direction of the valve inlet.

Another embodiment of the invention provides for the number of throttle outlet openings to be different in the respective xy planes. However, an embodiment in which each xy plane has the same number of throttle outlet openings is also conceivable.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below.

DESCRIPTION OF THE INVENTION

Figure 1:
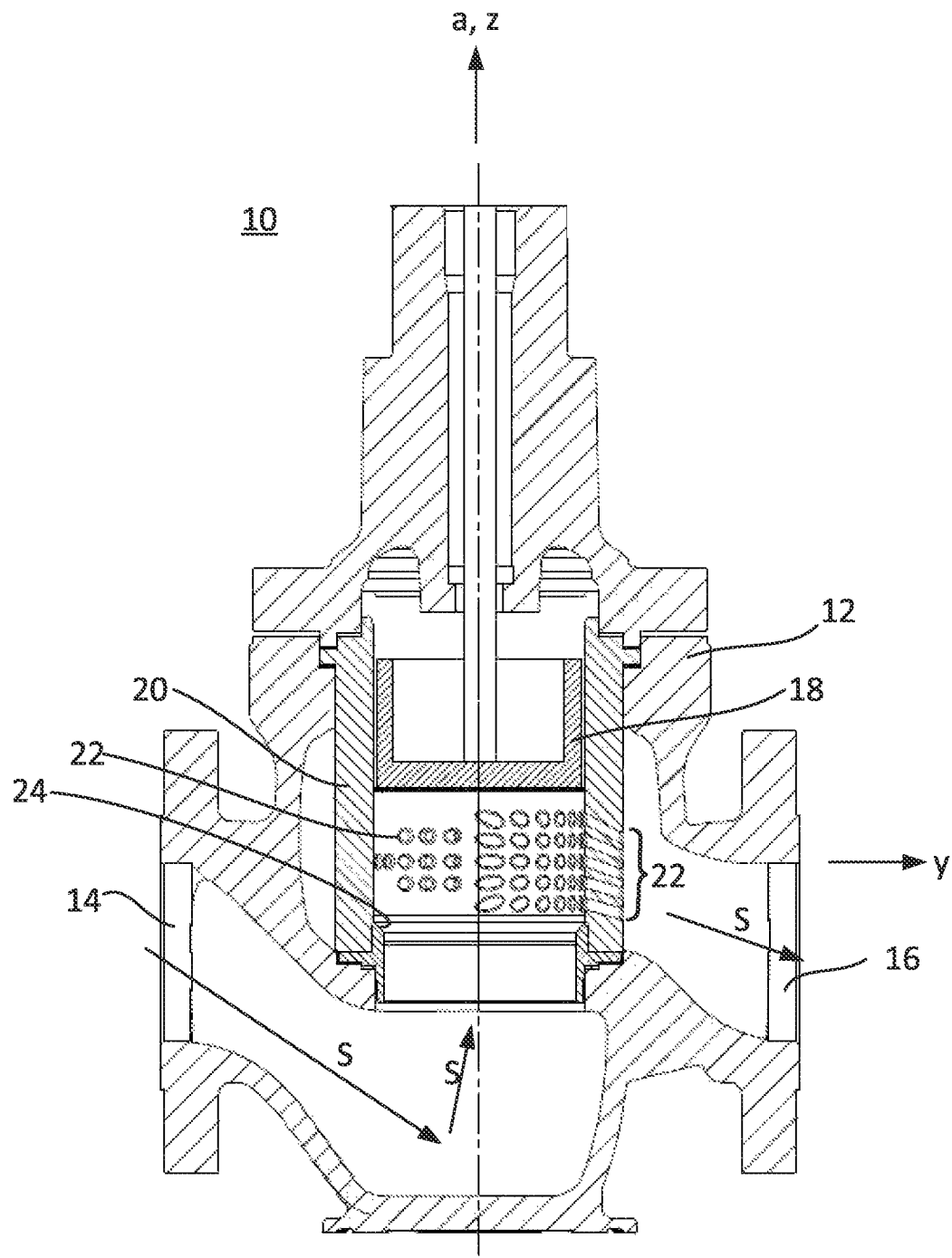
FIG. 1 is a sectional view of a cage valve according to the invention.

FIG. 1 shows a cage valve for a process plant, designated in its entirety by reference number 10. The cage valve 10 comprises a valve housing 12 with a valve inlet 14 and a valve outlet 16, a valve element 18 which is movably supported in the valve housing 12 of the cage valve 10 in the axial direction a, and a valve cage 20 which is arranged in the flow channel of the valve housing 12, i.e. between the valve inlet 14 and the valve outlet 16.

The sleeve-shaped valve cage 20 comprises an upper guide region, viewed in the axial direction a or in the z direction, which guides the valve element 18 in the axial direction, and a throttle region located underneath it, which has multiple throttle channels 22 that are arranged in a distributed manner when viewed in the axial direction a and in the circumferential direction u. In this case, the throttle region has five rows of throttle channels arranged in a distributed manner in the circumferential direction.

As illustrated in FIG. 1 by the arrows indicating the through-flow direction S, a process medium enters the cage valve 10 via the valve inlet 14, flows into the interior of the valve cage 20 via the lower end face and out of the valve cage 20 again via the throttle channels 22, before flowing out of the cage valve 10 again via the valve outlet 14.

The number of closed or opened throttle channels 22, i.e. the opening width of the valve cage 20 and hence the throttle rate, can thus be adjusted in a known manner by appropriately positioning the valve element 18 axially in relation to the valve cage 20.

For completely closing the cage valve 10, the cage valve 10 further comprises a valve seat 24 which interacts with the valve element 18 and is designed to be complementary to the valve element 18.

Figure 3:
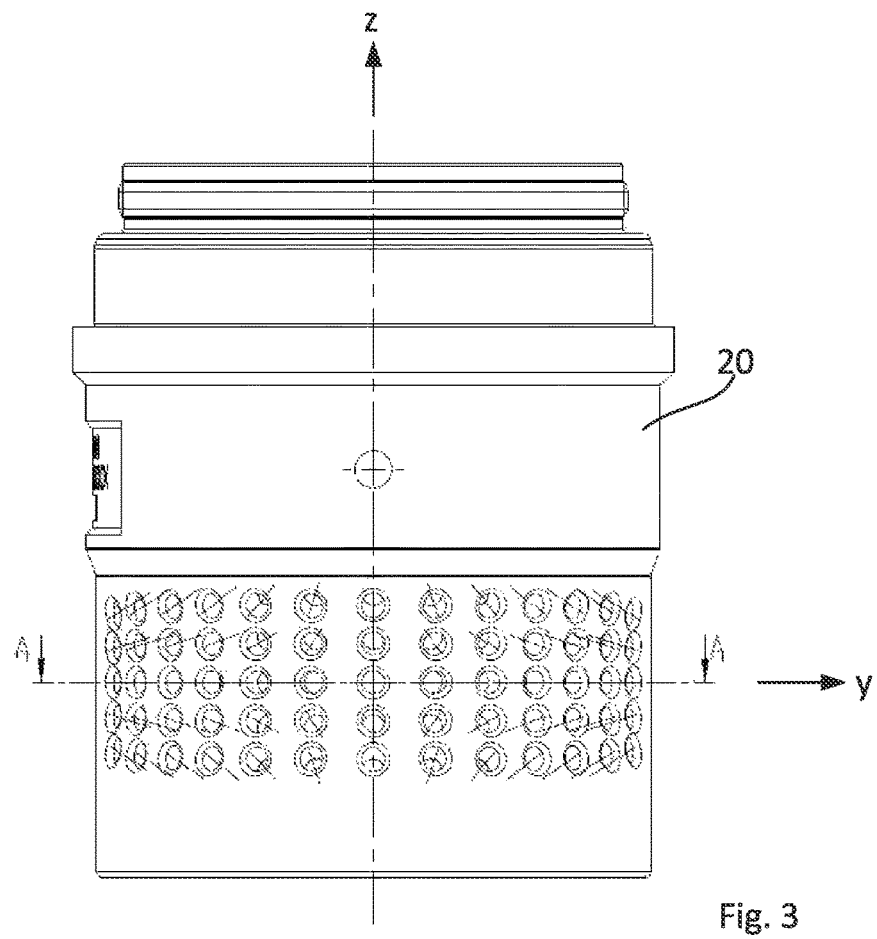
FIG. 3 is a view of another valve cage of a cage valve according to the invention.

As can be seen from FIG. 1 and FIG. 3, the throttle channels 22 are arranged in the throttle region of the valve cage 20, distributed in the axial direction a and in the circumferential direction u, in such a way that—in relation to a Cartesian coordinate system in which the x axis is oriented in the direction of the valve outlet 16, the z axis is oriented upwards in the axial direction a and the y axis is oriented perpendicular to the x, z axes—the throttle outlet openings of the throttle channels 22 on the outside of the valve cage are each located in xy planes parallel to the xy coordinate plane. This means that the throttle outlet openings of one row, or the center points of the throttle outlet openings of one row, each have the same z coordinate values.

Figure 2:
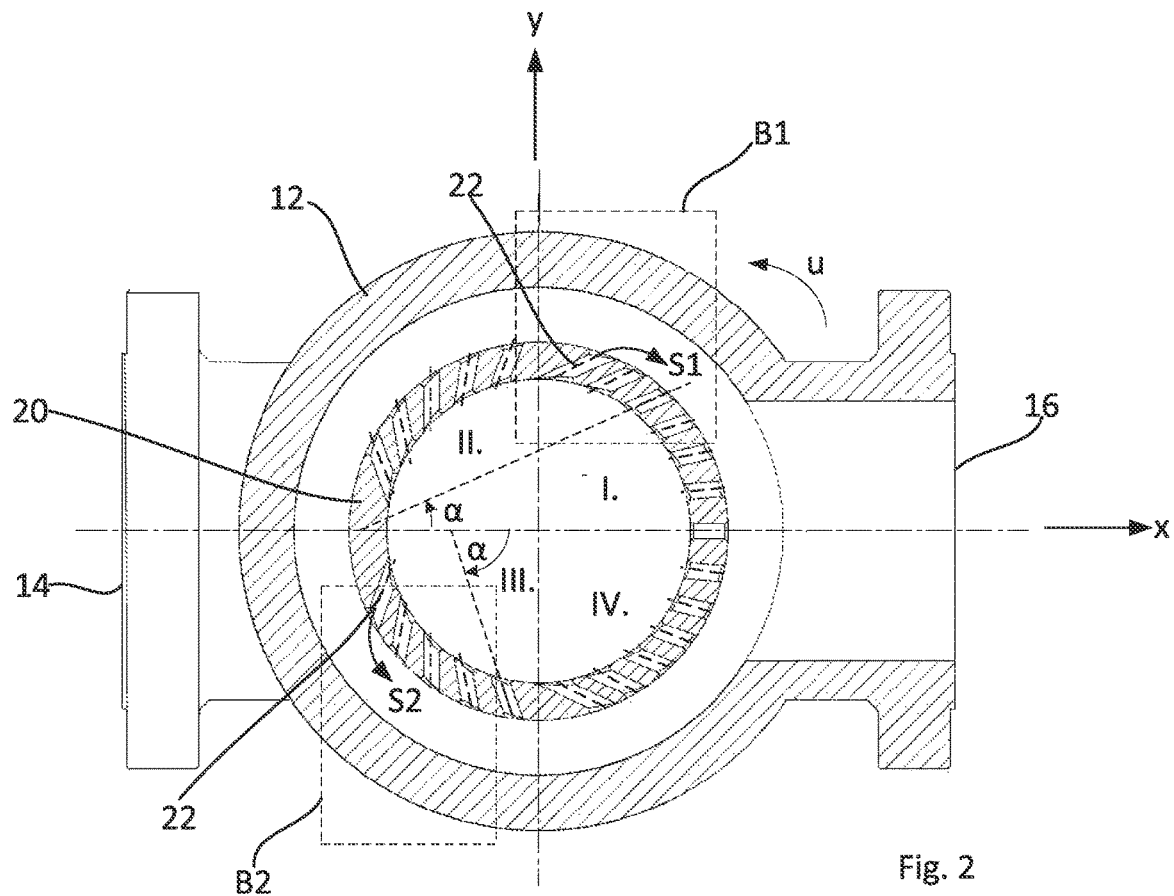
FIG. 2 is a top view of the valve cage shown in section in FIG. 1.
Figure 4:
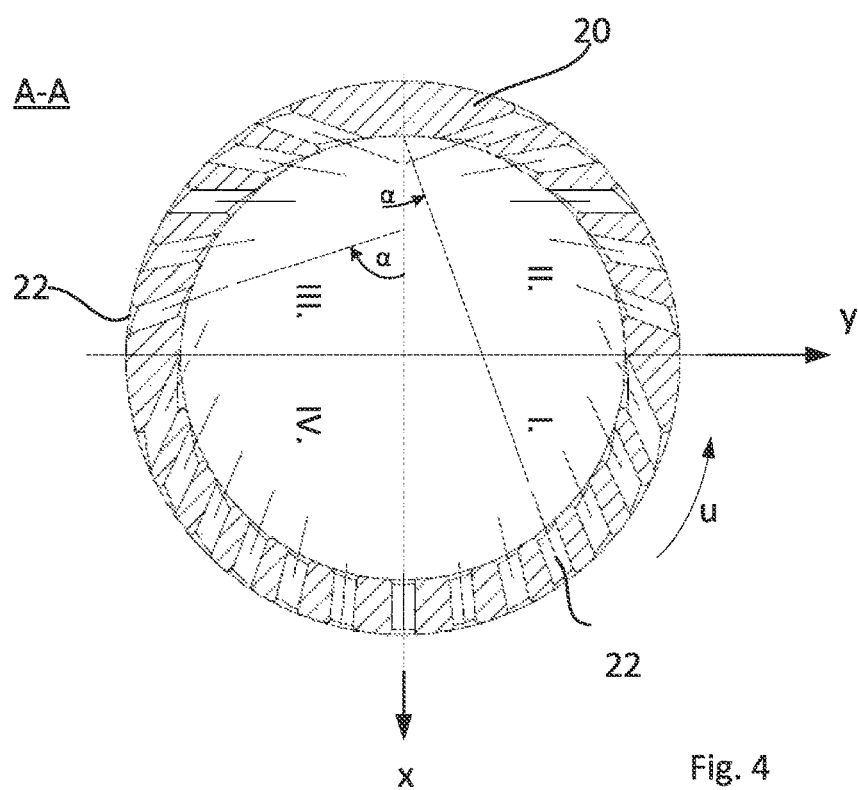
FIG. 4 is a sectional view of the valve cage of FIG. 3 taken along lines A-A.

In addition, as can be seen in particular from FIG. 2 and FIG. 4, the throttle channels 22 of the throttle outlet openings located in an xy plane are each aligned in such a way that—when projected into the associated xy plane—the channel axes of the throttle channels 22 are each set at an angle α relative to the x axis of this plane. For the sake of clarity, FIGS. 2 and 4 illustrate the associated angles α for two throttle channels 22 only, namely for a throttle channel in quadrant I and for a throttle channel in quadrant III.

As can be further seen from FIGS. 2 and 4, the alignment of the channel axes of the throttle channels 22 is selected such that—when projected into the associated xy plane—and in relation to the xy coordinate system spanning this plane, the channel axes of the throttle channels 22 in quadrants I and IV form an angle α of 0°≤angle α≤45°, and in quadrants II and III, they form an angle α of 80°≤angle α≤150° with the x axis.

As further seen in FIG. 2 and FIG. 4, the angle α in quadrants I and II is the counterclockwise angle between the x axis and the channel axis, while in quadrants III and IV, it is the clockwise angle between the x axis and the channel axis.

Figure 2A:
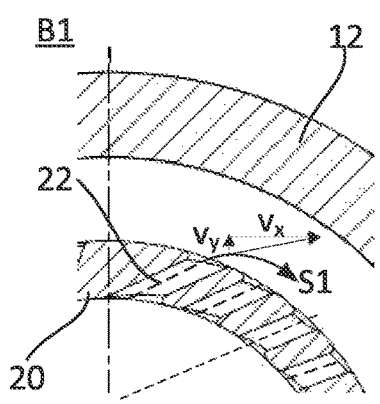
FIG. 2a is an enlarged view of area B1 of FIG. 2.
Figure 2B:
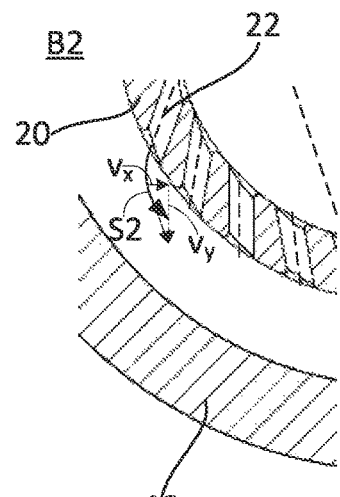
FIG. 2b is an enlarged view of area B2 of FIG. 2.

The alignment of the channel axes of the throttle channels 22 at an angle α has the effect that—as exemplified in FIG. 2a and FIG. 2b by two process medium flows S1, S2 emerging from associated throttle channels 22—the process medium flows emerging from the throttle outlet openings each have a velocity vector $$\vec{v} = \begin{pmatrix} v_x \\ v_y \\ v_z \end{pmatrix}$$

whose velocity component vx acting in the x direction, i.e. in the direction of valve outlet 16, will always be greater than zero, i.e. vx>0, which results in the process medium flows emerging from the throttle outlet openings of an xy plane each being deflected in the direction of valve outlet 16.

This means that the process medium flows emerging from the throttle outlet openings of a plane or a row are bundled tangentially in the direction of valve outlet 16. This in turn has the effect that—since the process medium flows now no longer impact on the surrounding walls of the valve housing 12 in a normal or vertical direction—the impact energy of the process medium flows as they impact on the housing walls is significantly reduced. Moreover, since the channel axes are not intended to be aligned at an angle of 90° and around 180°, or close to 90° and 180°, this also advantageously ensures that critical points are not directly exposed to the flow.

Moreover, as seen in FIG. 2 and FIG. 4, the throttle outlet openings located in an xy plane and/or—when projected into the associated xy plane, the channel axes of the throttle channels 22 associated with the throttle outlet openings, are arranged axially symmetrically to the x axis of the xy coordinate system spanning this plane. This has the effect of preventing rotation of the flow in the area of valve outlet 16.

As is further seen in FIGS. 2 and 4, the throttle outlet openings located in an xy plane are arranged in an unevenly distributed manner when viewed in the circumferential direction u in such a way that—again in relation to the xy coordinate system spanning this plane—more throttle outlet openings are arranged in quadrants I and IV than in quadrants II and III. In other words, the distance between the throttle outlet openings when viewed in the circumferential direction u is smaller in the area of the valve cage 20 facing the valve outlet 16, i.e. in the top view in quadrants I and IV, than in the rear area of the valve cage 20, i.e. the area of the valve cage 20 that encloses quadrants II and III in the top view. This ensures that a major part of the outflowing process medium flows enters into the valve outlet 16 virtually without any deflection.

Figure 5:
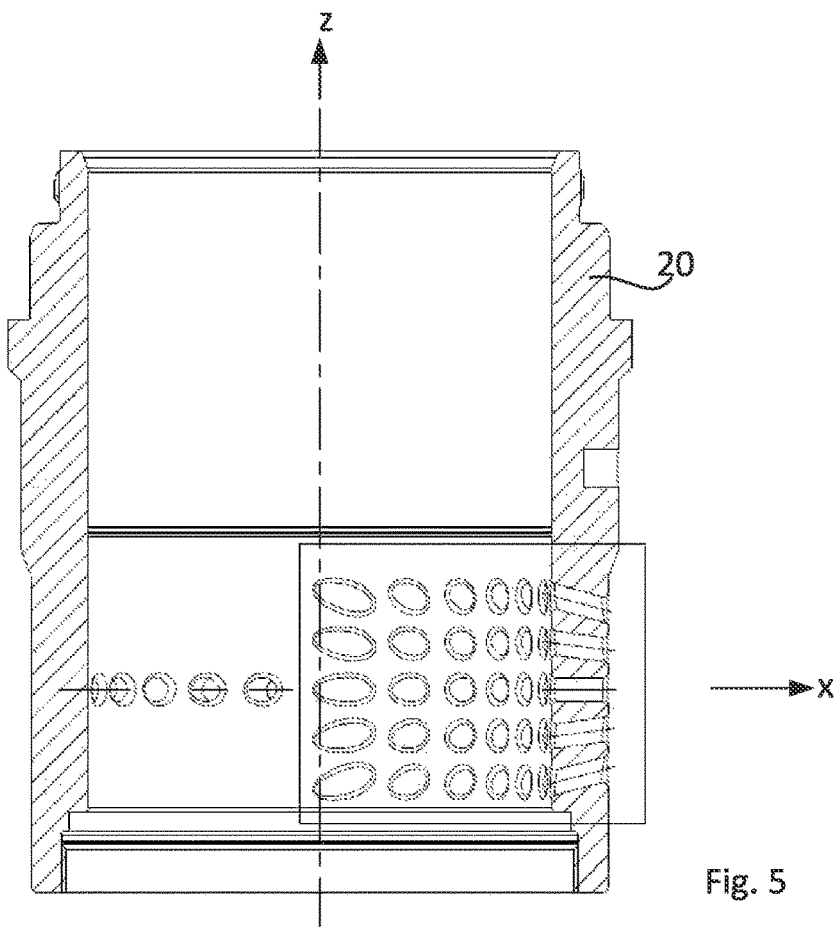
FIG. 5 is a longitudinal section of the valve cage of FIG. 3.
Figure 6:
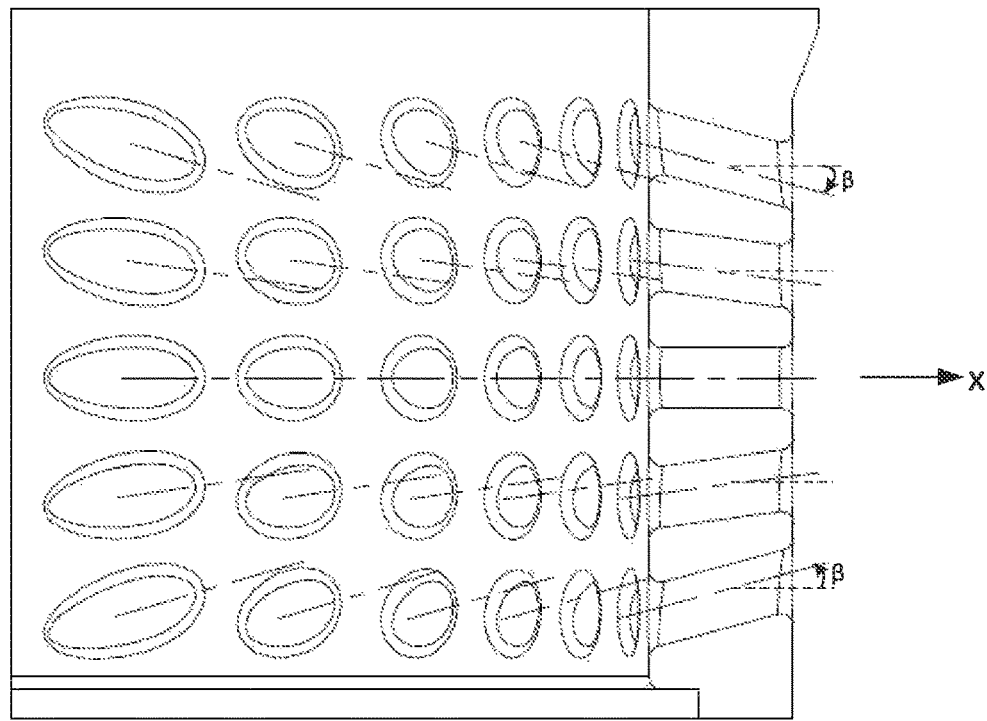
FIG. 6 is an enlarged detail of the valve cage of FIG. 5.

Moreover, as can be seen in FIG. 1 and in particular in FIGS. 5 and 6, the throttle channels 22 of the throttle outlet openings located in an xy plane are each aligned in such a way that, when projected into the associated xy plane, the channel axes of the throttle channels 22 are each set at an angle β relative to the x axis of this plane.

While in the embodiments shown in FIG. 1, the channel axes of the throttle channels 22 are set at an angle ß downwards in relation to the horizontal, in the embodiment shown in FIG. 3, the channel axes of the throttle outlet openings are set at an angle ß of ≤0° angle ß≤60° relative to the horizontal, see FIGS. 5 and 6.

In other words, each individual row of the several rows of throttle outlet openings, which are distributed in the circumferential direction u when viewed in the axial direction a, has an individual outflow direction in relation to the z axis, which is selected so that the process medium flows emerging from the throttle outlet openings are bundled and aligned in the z direction.

Thus, the cage valve 10 according to the invention is characterized in particular by the fact that, in addition to the tangential bundling directed towards the valve cage surface, the process medium flows flowing out of the throttle outlet openings are also bundled in the z or axial direction, i.e. vertically.

LIST OF REFERENCE SIGNS 10 cage valve
12 valve body
14 valve inlet
16 valve outlet
18 valve element
20 valve cage
22 throttle channels
24 valve seat
a axial direction
U circumferential direction
S low direction
S1 process medium flow
S2 process medium flow
α angle
ß angle
I, II, III, IV quadrants of the coordinate system

The invention claimed is:

1. Cage valve (10) comprising a valve housing (12) with a valve inlet (14) and a valve outlet (16);
a valve cage (20) which is arranged between the valve inlet and valve outlet (14, 16) in a flow channel, and a valve element (18) which is movably supported in the valve housing (12) in an axial direction (a) with respect to the valve cage (20);
wherein the valve cage (20) has a guide region, which guides the valve element (18) in the axial direction (a), and a throttle region, which has throttle channels (22) that are mutually spaced in the axial direction and are arranged in a distributed manner when viewed in a circumferential direction (u), so that different throttle rates can be set on a basis of an axial position of the valve element (18) relative to the valve cage (20); and characterized in that the throttle channels (22) are arranged such that the process medium flows exiting the throttle channels (22) are deflected in the circumferential direction (u) in a direction towards the valve outlet (16) and flow out in a bundled manner in the axial direction (a).

2. Cage valve (10) according to claim 1, characterized in that—in relation to a Cartesian coordinate system in which an x axis is aligned in the direction towards the valve outlet (16), a z axis is aligned upwards in the axial direction (a), and a y axis is aligned perpendicular to the x and z axes—throttle outlet openings of the throttle channels (22) on an outside of the valve cage are each arranged in xy planes parallel to the xy coordinate plane; and
wherein the throttle channels (22) of the throttle outlet openings lying in an xy plane are each aligned in such a way that—when projected into the associated xy plane—channel axes of the throttle channels (22) are each set at an angle (α) to the x axis of the xy plane, that the process medium flows exiting the throttle outlet openings of an xy plane are each deflected in a direction towards the valve outlet (16), and that—when projected into the xz coordinate plane—the channel axes are each set at an angle (β) in relation to the x axis in such a way that the process medium flows exiting the throttle outlet openings flow out in a bundled manner in the z direction.

3. Cage valve (10) according to claim 2, characterized in that the channel axes of the throttle channels (22) are set at an angle (β) of 0°≤angle (β)≤60° upwards or downwards in relation to the x axis.

4. Cage valve (10) according to claim 2, characterized in that the channel axes of all throttle channels (22) located in an xy plane are set at the same angle (β) to the x axis.

5. Cage valve (10) according to claim 2, characterized in that the channel axes of the throttle channels (22) located in an xy plane are set at different angles (β) to the x axis.

6. Cage valve (10) according to claim 2, characterized in that—when projected into the associated xy plane—and in relation to the xy coordinate system spanning the plane, in quadrants I and IV, the channel axes of the throttle channels (22) form an angle (α) of 0°≤angle (α)≤45° with the x axis, and in quadrants II and III, the channel axes of the throttle channels (22) form an angle (α) of 80°≤angle (α)≤150° with the x axis.

7. Cage valve (10) according to claim 2, characterized in that the throttle outlet openings located in an xy plane are arranged axially symmetrically to the x axis of the xy coordinate system spanning the plane.

8. Cage valve (10) according to claim 2, characterized in that the throttle outlet openings located in an xy plane are arranged in an evenly distributed manner when viewed in the circumferential direction (u).

9. Cage valve (10) according to claim 2, characterized in that the throttle outlet openings located in an xy plane are arranged in an unevenly distributed manner when viewed in the circumferential direction (u) in such a way that—in relation to the xy coordinate system spanning the plane—more throttle outlet openings are arranged in quadrants I and IV than in quadrants II and III.

10. Cage valve (10) according to claim 2, characterized in that the throttle channels (22) of the throttle outlet openings located in an xy plane are aligned in such a way that—when projected into the associated xy plane and with respect to the xy coordinate system spanning the plane—the channel axes meet at a common intersection point which is located on the x axis and has a negative x value.

11. Cage valve (10) according to claim 2, characterized in that the number of throttle outlet openings differs in the respective xy planes.

12. Cage valve (10) according to claim 2, characterized in that each xy plane has the same number of throttle outlet openings.

* * * * *